(12) United States Patent
Johnson et al.

(10) Patent No.: US 7,177,041 B2
(45) Date of Patent: Feb. 13, 2007

(54) METHOD AND APPARATUS FOR DETECTING AND PROCESSING PRINT JOBS THAT REQUEST BACKCHANNEL DATA

(75) Inventors: Charles David Johnson, Boulder, CO (US); Russel Neil Miller, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 904 days.

(21) Appl. No.: 09/974,277

(22) Filed: Oct. 9, 2001

(65) Prior Publication Data

US 2002/0021454 A1   Feb. 21, 2002

Related U.S. Application Data

(63) Continuation-in-part of application No. 09/550,669, filed on Apr. 17, 2000.

(51) Int. Cl.
G06F 3/12 (2006.01)

(52) U.S. Cl. ..................... 358/1.15; 358/1.16

(58) Field of Classification Search ............... 358/1.14, 358/1.15, 1.16
See application file for complete search history.

(56) References Cited

U.S. PATENT DOCUMENTS

| | | | |
|---|---|---|---|
| 5,566,278 A | 10/1996 | Patel et al. | |
| 5,602,974 A | 2/1997 | Shaw et al. | |
| 5,638,497 A | 6/1997 | Kimber et al. | |
| 5,651,114 A * | 7/1997 | Davidson, Jr. | 709/229 |
| 5,740,028 A | 4/1998 | Sugiyama | |
| 5,781,711 A | 7/1998 | Austin et al. | |
| 5,787,237 A | 7/1998 | Reilly | |
| 5,791,790 A | 8/1998 | Bender et al. | |
| 5,859,956 A | 1/1999 | Sugiyama et al. | |
| 5,873,659 A | 2/1999 | Edwards et al. | |
| 5,898,823 A | 4/1999 | Sorkin et al. | |
| 5,946,458 A | 8/1999 | Austin et al. | |
| 5,978,560 A | 11/1999 | Tan et al. | |
| 5,995,720 A | 11/1999 | Sakurai et al. | |
| 5,996,029 A | 11/1999 | Sugiyama et al. | |
| 6,006,284 A | 12/1999 | Cockroft | |
| 6,020,973 A | 2/2000 | Levine et al. | |
| 6,130,757 A * | 10/2000 | Yoshida et al. | 358/1.15 |
| 6,606,163 B1 * | 8/2003 | Suzuki et al. | 358/1.15 |
| 6,633,395 B1 * | 10/2003 | Tuchitoi et al. | 358/1.14 |
| 2002/0021453 A1 * | 2/2002 | Sakamoto et al. | 358/1.14 |

* cited by examiner

*Primary Examiner*—King Y. Poon
*Assistant Examiner*—Peter K. Huntsinger
(74) *Attorney, Agent, or Firm*—David W. Lynch; Chambliss, Bahner & Stophel P.C.

(57) ABSTRACT

The present invention detects the presence of commands requesting backchannel data in a print job and directs the flow of print jobs accordingly. If commands requesting backchannel data are detected, the jobs are routed directly to the interpreter and the print engine. If no commands for backchannel data are detected in the print job, the job may be routed to a spooler. If a print job containing commands for backchannel data is cancelled, the job data are processed through the interpreter to generate the backchannel content and are purged after the interpreter and before the job is committed to paper. Print jobs that do not contain commands requesting backchannel data are purged from the point of job cancellation.

12 Claims, 5 Drawing Sheets

METHOD AND APPARATUS FOR DETECTING AND PROCESSING PRINT JOBS THAT REQUEST BACKCHANNEL DATA

REFERENCE TO RELATED APPLICATIONS

This is a continuation-in-part of U.S. patent application Ser. No. 09/550,669, filed Apr. 17, 2000 entitled METHOD AND APPARATUS FOR DETERMINING HOW TO PROCESS INCOMING PRINT JOBS, which is assigned to the assignee of the present invention and which is incorporated by reference herein.

BACKGROUND OF THE INVENTION

1. Field of the Invention

This invention relates in general to printing systems, and more particularly to a method and apparatus for detecting and processing print jobs that request backchannel data.

2. Description of Related Art

Printers receive print data from a source, such as a single host computer or from a network that contains at least one host computer or network server. One recent development is the addition of a "memory option," which is an internal memory device such as RAM (Random Access Memory) or a hard disk drive, where files may be stored prior to a print operation. In some conventional printers, the memory device (e.g., hard disk) is of a sufficient size to store many print jobs at one time. Moreover, the "normal" temporary memory storage device (i.e., typically volatile RAM) used to store incoming print jobs may also be of a sufficient size to store many print jobs at one time, even as the printer is in the process of printing an earlier-received print job.

In typical desktop personal computer (PC) environments, a printer may contain one or more attachments over which print data is received. Attachments may be physical or logical. Print jobs are submitted (via either a direct connection or via a network) to a printer that contains sufficient memory to accept more than one entire print job, and by using this capability, a quick "screen release" is achieved. The term "screen release" represents the concept that, once a print job is accepted by a printer, the desk top PC is "released" by that printer, and the PC is no longer waiting for the printer to continue accepting the data. Until conventional printers accept all of the data for a particular print job from the host computer (i.e., the PC), the host computer can be unusable by its human user ("locked up") until the active printing session is complete. An active printing session becomes "complete" generally when the print job has been completely accepted by the printer. At that time, the printer's software communicates to the host PC's software that the job has been accepted.

The desire to achieve a quick screen release has produced various solutions in the printer field of art. One conventional solution is to implement a "print spooler" in various operating systems, including PC operating systems (e.g., Microsoft Windows 95™, IBM OS/2™), as well as network operating systems (e.g., Novell Netware™, and IBM LAN Server™). Another conventional solution is to add more memory to the printers so as to allow the printers to completely accept various print jobs long before they are physically printed.

In a printer, a hard disk may be used as a spooling device. In general, an incoming job may be directed to the hard disk (spooled), or it may be directed to the print engine, or the transmission of job data may be temporarily suspended. When an incoming print job is spooled, jobs directed to the spooler are processed at a later time, consequently the receipt of the job is separated from the processing of the job. The processing that is deferred involves the interpretation of the data stream and generation of printed material. The delay between job receipt and job interpretation is dependent upon the availability of the print engine and other factors, and is not predictable.

Some types of jobs, and some print channels, do not work correctly when a job is directed to the spooler. Depending on the content of the data stream, the interpretation process may result in the generation of backchannel information by the interpreter for transmission back to the job submitter. Jobs that request backchannel data are incompatible with a spooler due to the separation of job receipt and job processing. The submitting system transmits some or all of the print data to the printer and waits for a response. If the job is spooled, then the printer expects to receive the entire job and process it at a later time. In this case, the system submitting the job and the printer are out of synchronization. This type of problem is typically corrected by manually configuring the printer not to spool jobs from sources that are known to request backchannel data. However, this solution requires the printer to avoid spooling any job deriving from sources known to request backchannel data, even when a particular job deriving from that source does not request backchannel data and may be spooled.

In systems where a printer is shared among several workstations, it is desirable to handle print job cancellation as quickly as possible, so that the cancellation of one job does not delay the processing of another job. In a printer, job cancellation is performed by purging all internal print data for the job, and all subsequent data for the job that the printer receives. The printer does not examine or interpret any job data from the point of the job cancellation request through the remainder of the job. Jobs that request backchannel data are incompatible with a fast job cancellation method because all print data, including any requests for printer information that generates backchannel data, is purged from the point of job cancellation to the end of job. This type of problem is typically handled by avoiding implementation of fast job cancellation. However, this solution slows down the cancellation for every job, regardless of whether or not the job is one that requests backchannel communication.

Print jobs requesting backchannel data communication present problems in systems where several workstations use a shared printer. Prior art solutions do not distinguish between print jobs requiring backchannel data communication and those that do not require such communication. Consequently, every print job from a channel known to submit print jobs requesting backchannel data must be immediately processed rather than spooled. Furthermore, fast job cancellation is not possible when jobs requesting backchannel data communication cannot be distinguished from jobs that do not request such communication.

It can be seen there is a need for a method and apparatus for detecting print jobs that request backchannel data so that print jobs can be processed more efficiently, both in the initial routing of a job, and in cancellation of a job.

SUMMARY OF THE INVENTION

To overcome the limitations in the prior art described above, and to overcome other limitations that will become apparent upon reading and understanding the present specification, the present invention discloses a method and apparatus for detecting and processing print jobs that request backchannel data.

The present invention solves the above-described problems by examining data in the incoming job to detect the presence of commands that request the generation of backchannel data. Such a method can be used to dynamically examine the content of an incoming job and direct jobs that request backchannel data to the print engine rather than the spooler.

A method in accordance with the principles of the present invention includes detecting the presence of commands requesting backchannel data communication and processing the incoming print job based upon the presence of commands requesting backchannel data communication in the incoming print job.

In another embodiment of the present invention, an article of manufacture comprising a computer storage medium readable by a computer is provided. The medium tangibly embodying one or more programs of instructions executable by the computer to perform a method for processing incoming print jobs, the method including detecting the presence of commands requesting backchannel data communication and processing the incoming print job based upon the presence of commands requesting backchannel data communication in the incoming print job.

In another embodiment of the present invention, a print system is provided. The print system according to the present invention includes a print engine for receiving a data stream for an incoming print job and generating print media based upon the data stream, and a multiplexer coupled to the print engine, wherein the multiplexer further comprises a job sniffer that detects the presence of commands requesting backchannel data communication.

In yet another embodiment of the present invention, a system includes means for detecting the presence of commands requesting backchannel data communication and means for processing the incoming print job based upon the presence of commands requesting backchannel data communication in the incoming print job.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for determining how to process incoming print jobs which request backchannel information. The present invention examines data in the incoming job and processes the attributes of the job to detect backchannel data requests to determine how to route the incoming print jobs.

Figure 1:
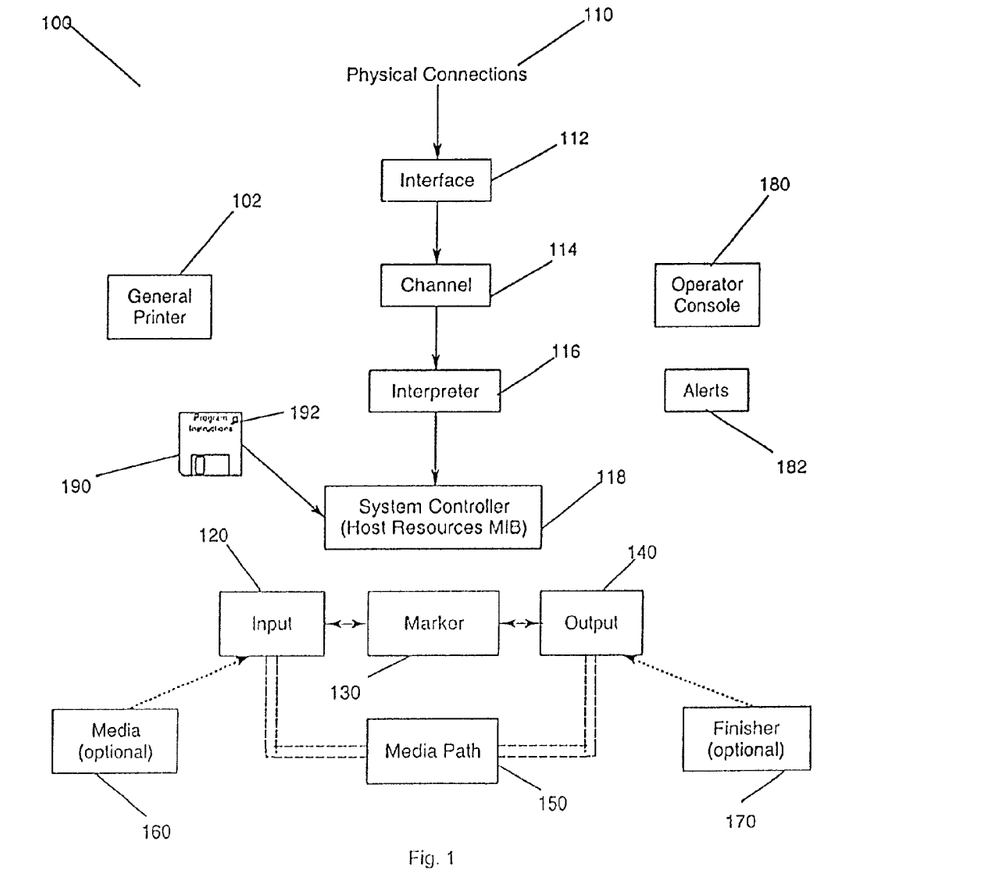
FIG. 1 illustrates a block diagram of a printer according to the present invention.

FIG. 1 illustrates a block diagram of a printer 100 according to the present invention. Those skilled in the art will recognize that the sub-units of the printer illustrated in FIG. 1 may not necessarily relate directly to any physically identifiable mechanism. Sub-units can also be a set of definable logical processes, such as interpreters for page description languages or command processors that set various operating modes of the printer.

FIG. 1 illustrates the three basic functions of the printer: (1) the flow of a print file into an interpreter and onto the marker, (2) the flow of media through the marker and (3) the auxiliary sub-units that control and facilitate the two flows. As shown in FIG. 1, the flow of the print data comes through a physical connection 110 on which some form of transport protocol stack is running to a printer interface 112. The data provided by the transport protocol (interface) appears on a channel 114. The channel 114 provides the data stream to the input to an interpreter 116. The interpreter 116 is responsible for the conversion of a description of intended print instances into images that are to be marked on the media. A printer may have one or more interpreters.

As shown in FIG. 1, the media 160 initially resides in Input sub-units 120 from which the media 160 is selected and then transported via a Media Path 150 first to a Marker 130 and then onto an Output 140 with (optionally) some finishing operations 170 being performed. The Input 120 is a mechanism that feeds media to be marked on into the printer. There may be as many Inputs 120 as there are distinctly selectable input "addresses". The Media 160 is an extension of the Input 120 that represents that media that is in an Input 120. The Output 140 is a mechanism that receives media that has been marked on. A printer may contain one or more Output mechanisms 140. There are as many Outputs 140 as there are distinctly selectable output "addresses". A finisher 170 is a unit that performs some operations on the media other than marking. Some examples of finishing processes are stapling, punching, binding, inserting, or folding.

A Marker 130 is the mechanism that produces marks on the print media. A printer can contain one or more Markers 130. Some examples of multiple marker sub-units 130 are: a printer with separate markers for normal and magnetic ink or an image setter that can output to both a proofing device and final film. Each Marker 130 can have its own set of characteristics associated with it, such as marking technology and resolution. The media paths 150 encompass the mechanisms in the printer that move the media through the printer and connect all other media related units: Inputs 120, Outputs 140, Markers 130 and Finishers 170. A printer may contain one or more media paths 150. In general, the design of the media paths 150 determines the maximum speed of the printer as well as the maximum media size that the printer can handle. Media paths 150 are complex mechanisms and can contain many different identifiable sub-mechanisms such as media movement devices, media buffers, duplex units and interlocks. Not all of the various sub-mechanisms reside on every media path 150. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that multiple copies of the obverse side to be held before the reverse side of all the copies are marked.

The auxiliary sub-units, such as the General Printer 102, Operator Console 180 and Alerts 182, facilitate control of the printer, inquiry/control of the operator panel, reporting of alerts, and the adaptation of the printer to various natural languages and characters sets. The General Printer 102 is responsible for the overall control and status of the printer. The Operator Console 180 is used to display and modify the state of the printer. The console 180 can be as simple as a few indicators and switches or as complicated as full screen displays and keyboards. The Alert unit 182 is responsible for detecting reportable events, making an entry in the alert table and, if and only if the event is a critical event, initiating a trap.

All of the above described functions run on the System Controller 118, which represents the processor, memory and storage systems of the printer. The System Controller 118 implements the control functions for processing a print job. The System Controller 118 includes the MIB, which provides access to data elements of the printer, such as the processor(s), memory, disk storage, file system and other underlying sub-mechanisms of the printer. The System Controller 118 can range from simple single processor systems to multiprocessor systems. In addition, controllers can have a full range of resources such as hard disks. Those skilled in the art will recognize that a printer may have more than one processor and multiple other resources associated with it.

A process for detecting the presence of backchannel data requests in an incoming job is performed by the System Controller 118. The process, as will be described below with reference to FIGS. 2–5, may be tangibly embodied in a computer-readable medium or carrier, e.g. one or more of the fixed and/or removable data storage devices 190, or other data storage or data communications devices. The computer program 192 of the storage device 190 may be loaded into System Controller 118 to configure the System Controller 118 for execution. The computer program 192 comprise instructions which, when read and executed by the System Controller 118 causes the System Controller 118 to perform the steps necessary to execute the steps or elements of the present invention.

Figure 2:
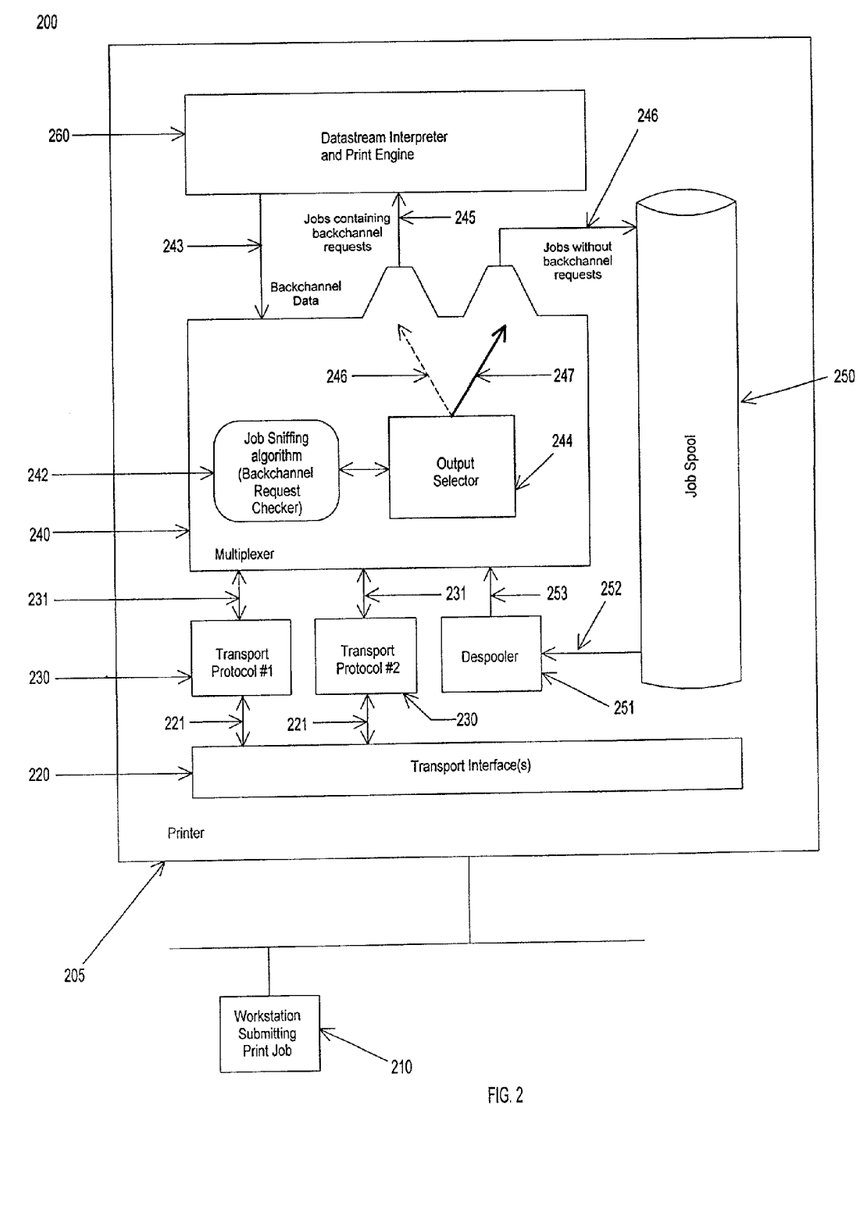
FIG. 2 illustrates a block diagram of a printer in accordance with the present invention implementing a backchannel data request checker.

FIG. 2 illustrates the backchannel request checker function of a printer in accordance with the present invention. Workstations 210 may be coupled to the printer by any conventional means, e.g., by direct connection, wireless gateways/routers, a network, etc. An incoming print job flows through the transport interface 220, which is running a transport protocol stack 230 appropriate for the data channel being serviced. The data provided by the transport interface 220 appears on a channel 231 and is transmitted to the multiplexer 240.

As shown in FIG. 2, a job sniffer 242 resides in the multiplexer and communicates with the output selector 244. The content of a print job initially received by the multiplexer 240 is examined by the job sniffer 242 to detect the presence of commands that request generation of backchannel data. Jobs requesting backchannel data communication 245 cannot be routed to the spooler 250 due to separation of job receipt and job processing causing the workstation 210 submitting the job and the printer 205 to become out of synch. In the event that such commands are detected, the print job is routed directly to the datastream interpreter and print engine 260. In the event that no such backchannel request commands are detected 246, the print job is routed to the job spooler 250 when the printer cannot process the job immediately. The spooler 250 is capable of storing a number of print jobs waiting to be printed. At the opportune time, the stored print jobs are sent through connection 252 to the despooler 251, to the multiplexer through connection 253 and to the datastream interpreter and print engine 260.

Figure 3:
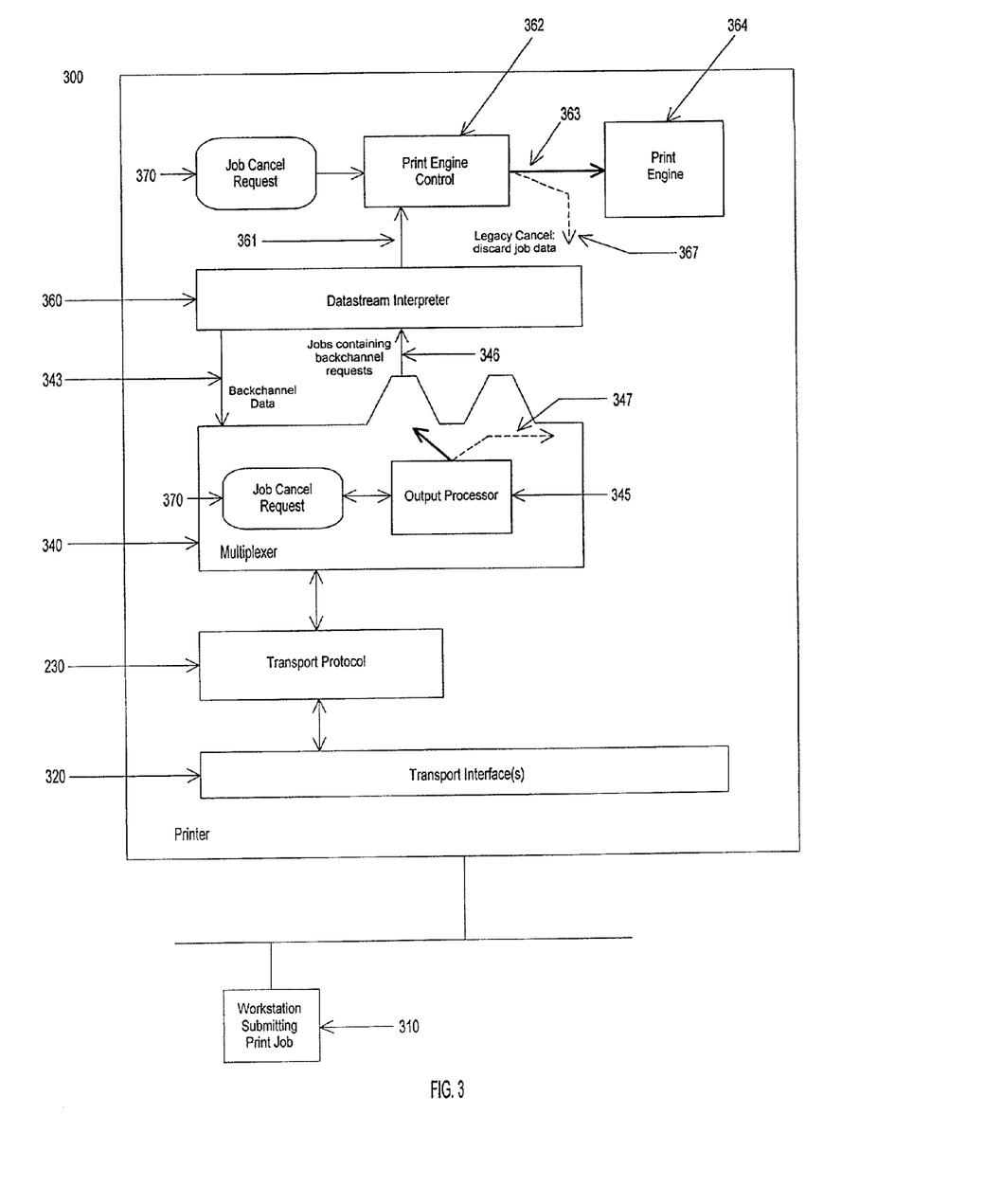
FIG. 3 illustrates a block diagram of a printer according to the present invention implementing fast cancel processing.

FIG. 3 illustrates the basic functions of the method for print job cancellation in accordance with the present invention. A print job may be cancelled by the user through, for example, the printer operator console (180, FIG. 1) or through a web page. If a print job is cancelled, the job cancel request is implemented at the output processor 345 located within the multiplexer 340 or the print engine control 362. Print jobs that do not contain requests for backchannel data are cancelled by purging data 347 at the multiplexer output processor 345. Job cancellation for jobs that do not request backchannel data is performed by purging all internal print data for the job, and all subsequent data for the job that the printer receives.

The cancellation of job that has been detected to contain requests for backchannel data is handled differently than those without such detection. Print jobs containing requests for back channel data 346 must not be purged at the multiplexer output processor 345, and must be processed through the interpreter 360 to generate the backchannel content 343. Print data for a job containing requests for backchannel data is purged 367 by the print engine control 362 after interpreter 360 and before the job is committed to media.

Figure 4:
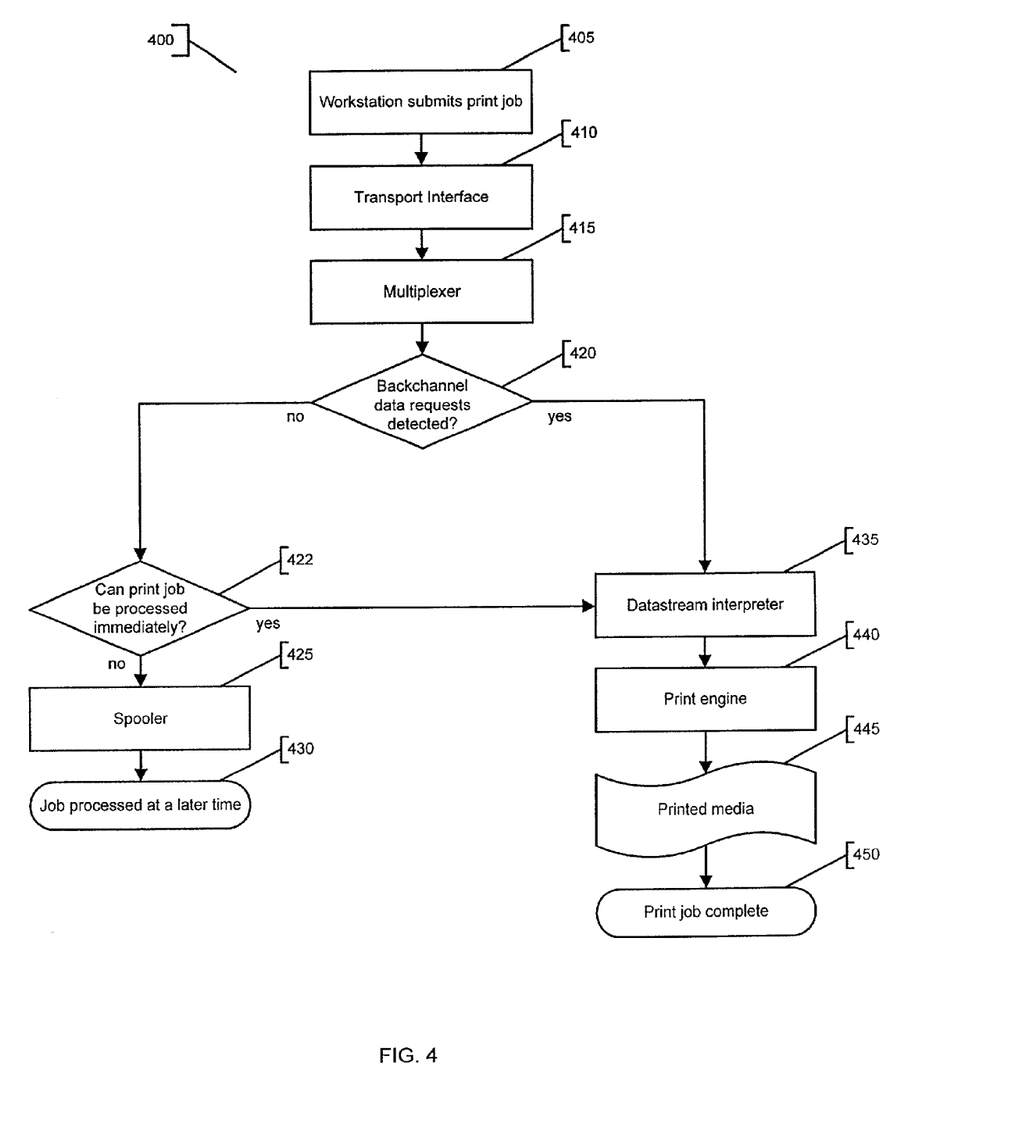
FIG. 4 is a flowchart of the method of processing a print job according to the present invention.

FIG. 4 is a flowchart of the method of processing a print job according to the present invention. A workstation submits a print job 405. The print job flows to the transport interface 410 and thus to the multiplexer 415. The job sniffer detects the presence or absence of commands requesting backchannel information in the print job 420. If there are no such commands at 420, and if the print job cannot be processed immediately 422, the print job proceeds to the spooler at 425 to be processed at a later time 430. If there are commands in the print job requesting backchannel data communication 420, the print job proceeds to the data stream interpreter 435 and to then to the print engine 440 where the print job is finally committed to the print job to media at 445 and the print job is complete 450.

Figure 5:
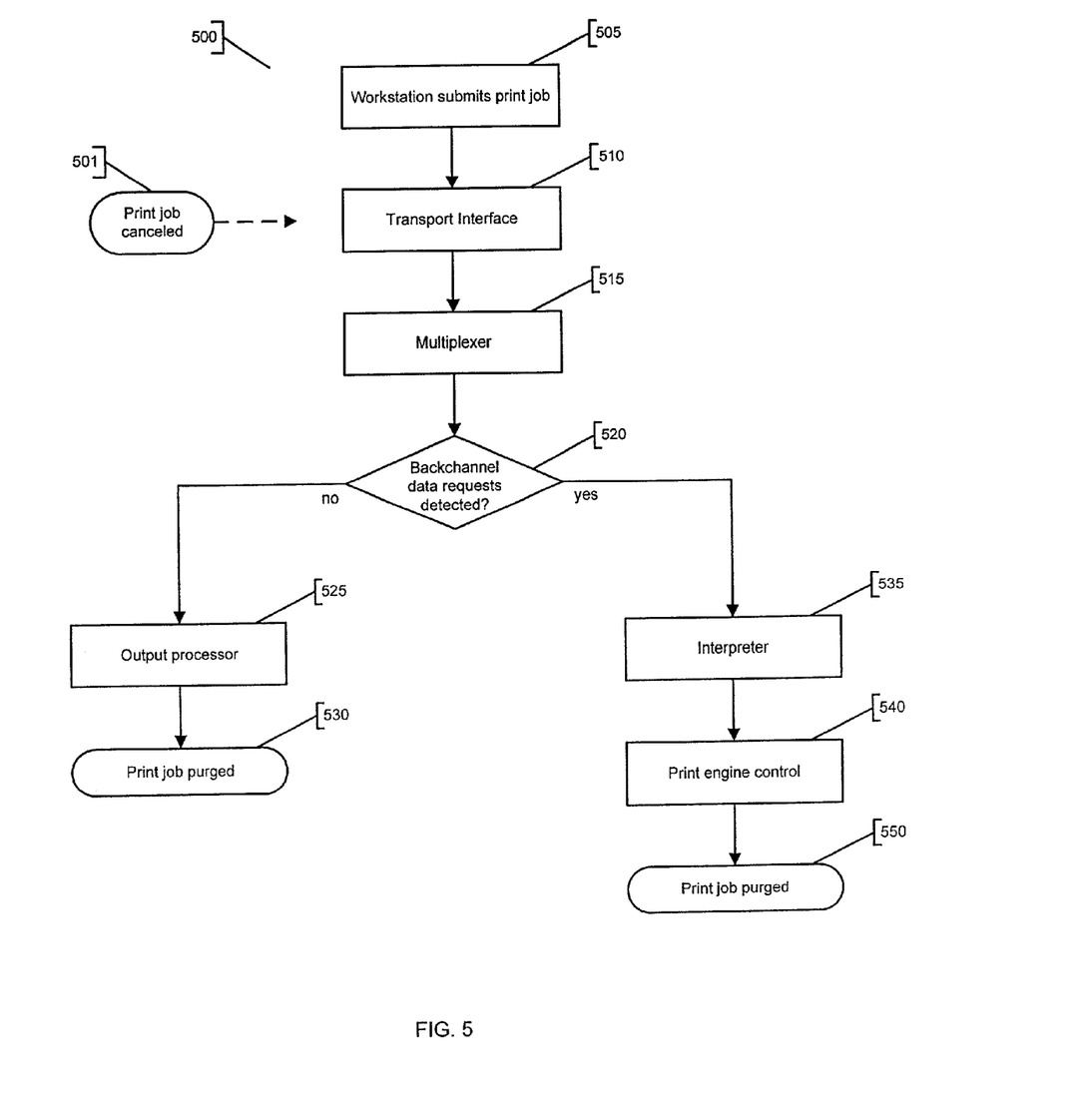
FIG. 5 is a flowchart of the method of canceling a print job according to the present invention.

FIG. 5 is a flowchart of the method of canceling a print job according to the present invention. A workstation submits a print job 505 that flows through the transport interface 510 and to the multiplexer 515. At some time, the print job is cancelled 501. The job sniffer detects the presence or absence of commands requesting backchannel information in the print job 520. If there are no such commands at 520, the data is routed to the output processor 525 where it is discarded 530. If there are commands in the print job requesting backchannel data communication 520, the print job is processed through the interpreter 535 to properly generate the backchannel content. The print job is then routed to the print engine control 540 where the print job is discarded prior to being committed to media 545.

In summary, the present invention provides a method for detecting and processing print jobs that request backchannel data. A multiplexer system with a job sniffing algorithm is provided for analyzing jobs received from client systems through print channels. The job sniffing algorithm in the multiplexer dynamically examines the contents of an incoming print job and detects the presence of commands requesting backchannel data. If the incoming print job requests backchannel data, the multiplexer directs the job directly to the interpreter and print engine. If the job sniffing algorithm does not detect backchannel data requests, the print job may be spooled.

Cancellation of print jobs that do not request backchannel is accomplished by purging the data at the multiplexer output processor. Data for jobs that contain requests for backchannel data must not be purged at the output processor, and are processed through the interpreter to properly generate the backchannel content. Data for the job requesting backchannel data is purged after the interpreter but before the job is printed. This method makes it possible for a printer to accommodate fast cancellation of print jobs, even when some print jobs request backchannel data.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for processing incoming print jobs, comprising:
   receiving a print job;
   analyzing the received print job to detect the presence of commands in the received print job requesting backchannel data communication;
   processing the received print job at a datastream interpreter immediately when the print job includes commands requesting backchannel data communication; and
   when the received print job does not include commands requesting backchannel data communication, determining whether the received print job can be processed immediately and processing immediately at the datastream interpreter the received print job that does not include commands requesting backchannel data communication when the received print job that does not include commands requesting backchannel data communication can be processed immediately, else spooling the received print job that does not include commands requesting backchannel data communication.

2. A method as claimed in claim 1, wherein the processing further comprises implementing a job cancellation for a print job that does not contain commands requesting backchannel data communication at the point of job cancellation.

3. A method as claimed in claim 2, wherein the processing further comprises implementing job cancellation for a print job that contains commands requesting backchannel data communication after the print job is processed through an interpreter.

4. An article of manufacture comprising a computer storage medium readable by a computer, the medium tangibly embodying one or more programs of instructions executable by the computer to perform a method for processing incoming print jobs, the method comprising:
   receiving a print job;
   analyzing the received print job to detect the presence of commands in the received print job requesting backchannel data communication;
   processing the received print job at a datastream interpreter immediately when the print job includes commands requesting backchannel data communication; and
   when the received print job does not include commands requesting backchannel data communication, determining whether the received print job can be processed immediately and processing immediately at the datastream interpreter the received print job that does not include commands requesting backchannel data communication when the received print job that does not include commands requesting backchannel data communication can be processed immediately, else spooling the received print job that does not include commands requesting backchannel data communication.

5. An article of manufacture as claimed in claim 4, wherein the method for processing further comprises implementing a job cancellation for a print job that does not contain commands requesting backchannel data communication at the point of job cancellation.

6. An article of manufacture as claimed in claim 5, wherein the method for processing further comprises implementing job cancellation for a print job that contains commands requesting backchannel data communication after the print job is processed through an interpreter.

7. A print system, comprising:
   a print engine for receiving a data stream for an incoming print job and generating print media based upon the data stream; and
   a multiplexer coupled to the print engine;
   wherein the multiplexer further comprises a job sniffer and an output selector, the job sniffer analyzing the received print job to detect the presence of commands in the received print job requesting backchannel data communication and the output selector routing the received print job to a datastream interpreter for immediate processing when the job sniffer detects that the print job includes commands requesting backchannel data communication and, when the received print job does not include commands requesting backchannel data communication, the job sniffer determines whether the received print job can be processed immediately, the output selector routing the received print job to the datastream interpreter for immediate processing when the job sniffer determines that the received print job can be processed immediately, else the output selector routes the received print job to a spooler for spooling.

8. A system as claimed in claim 7, wherein the multiplexer implements a job cancellation for a print job that does not contain commands requesting backchannel data communication at the point of job cancellation.

9. A system as claimed in claim 8, wherein the multiplexer implements job cancellation for a print job that contains commands requesting backchannel data communication after the print job is processed through an interpreter.

10. A system comprising:
    means engine for receiving a data stream for an incoming print job;
    means for generating print media based upon the data stream; and means for controlling incoming print jobs, the means for controlling further comprising
  means for analyzing the received print job to detect the presence of commands in the received print job requesting backchannel data communication;
  means for routing the received print job to a datastream interpreter for immediate processing when the job sniffer detects that the print job includes commands requesting backchannel data communication and
  means for determining whether the received print job can be processed immediately when the received print job does not include commands requesting backchannel data communication, and
  means for routing the received print job to the datastream interpreter for immediate processing when the received print job can be processed immediately, else routing the received print job to a spooler for spooling.

11. A system as claimed in claim 10, wherein the means for processing further comprises means for implementing a job cancellation for a print job that does not contain commands requesting backchannel data communication at the point of job cancellation.

12. A system as claimed in claim 11, wherein the means for processing further comprises means for implementing job cancellation for a print job that contains commands requesting backchannel data communication after the print job is processed through an interpreter.

* * * * *